United States Patent [19]
Danhof et al.

[11] Patent Number: 6,076,328
[45] Date of Patent: Jun. 20, 2000

[54] STORAGE BUILDING AND APPARATUS FOR CONSTRUCTING A STORAGE BUILDING

[75] Inventors: Scott N. Danhof, Plain City; Christopher G. Ross, Columbus; Phillip A. Green, Columbus; Colin A. Chong, Columbus; David A. Holley, Lancaster, all of Ohio; Jeffrey L. Hall, Sorento; Michael A. Spicer, Trenton, both of Ill.

[73] Assignee: Arrow Group Industries, Inc., Wayne, N.J.

[21] Appl. No.: 08/907,586

[22] Filed: Aug. 8, 1997

[51] Int. Cl.[7] .................................................. G04B 1/41
[52] U.S. Cl. ................. 52/762; 52/766; 52/772; 52/468
[58] Field of Search ............................ 52/762, 766, 772, 52/468, 460, 222, 63; 403/375, 346, 347, 230

[56] References Cited

U.S. PATENT DOCUMENTS

| | | | |
|---|---|---|---|
| 2,058,386 | 10/1936 | Parsons | 72/115 |
| 2,105,771 | 1/1938 | Holdsworth | 72/46 |
| 2,620,525 | 12/1952 | Ketchum, Jr. . | |
| 2,638,162 | 5/1953 | Heitlinger et al. | 52/762 |
| 2,709,290 | 5/1955 | Rosenthal . | |
| 3,001,615 | 9/1961 | Ries | 189/35 |
| 3,394,525 | 7/1968 | McKee et al. | 52/653.1 |
| 3,653,172 | 4/1972 | Schwartz . | |
| 3,680,271 | 8/1972 | Satchell | 52/656 |
| 3,845,601 | 11/1974 | Kostecky | 52/290 |
| 4,144,681 | 3/1979 | Leffler et al. . | |
| 4,176,504 | 12/1979 | Huggins . | |
| 4,326,365 | 4/1982 | Svensson . | |
| 4,344,267 | 8/1982 | Sukolics . | |
| 4,452,029 | 6/1984 | Sukolics . | |
| 4,481,747 | 11/1984 | Tengesdal et al. . | |
| 4,809,476 | 3/1989 | Satchell | 52/241 |
| 4,817,655 | 4/1989 | Brooks | 52/222 X |
| 4,926,605 | 5/1990 | Milliken et al. | 52/63 |
| 5,209,029 | 5/1993 | Foerst | 52/222 X |
| 5,619,826 | 4/1997 | Wu . | |
| 5,794,400 | 8/1998 | Fisher et al. | 52/63 X |
| 5,797,233 | 8/1998 | Hascall | 52/653.1 X |
| 5,906,078 | 5/1999 | Cramer | 52/222 |

FOREIGN PATENT DOCUMENTS

| | | | |
|---|---|---|---|
| 29382 | 8/1949 | Australia | 52/762 |
| 29382/49 | 8/1950 | Australia . | |
| 14740/55 | 6/1957 | Australia . | |
| 83134/75 | 7/1975 | Australia . | |
| 26422/77 | 1/1980 | Australia . | |
| 20744/92 | 2/1993 | Australia . | |
| 1559347 | 10/1969 | Germany . | |
| 3038441 | 10/1980 | Germany . | |
| 1289318 | 9/1972 | United Kingdom . | |

OTHER PUBLICATIONS

Partial European Search Report dated Nov. 12, 1998, Application No. EP 98400418.

Australian Patent Office Examiner's First Report, dated Oct. 22, 1998, Petty Patent Application No. 87115/98.

*Primary Examiner*—Laura A. Callo
*Assistant Examiner*—Phi Dieu Tran A
*Attorney, Agent, or Firm*—Marshall, O'Toole, Gerstein, Murray & Borun

[57] ABSTRACT

Connection apparatus for connecting frame members and panel members is provided for constructing a storage building primarily from sheet metal. The apparatus utilizes connecting members that may be made from thermoplastic or metal materials. The number of threaded fasteners and time required to assemble the storage building is reduced dramatically from that of prior designs.

6 Claims, 18 Drawing Sheets

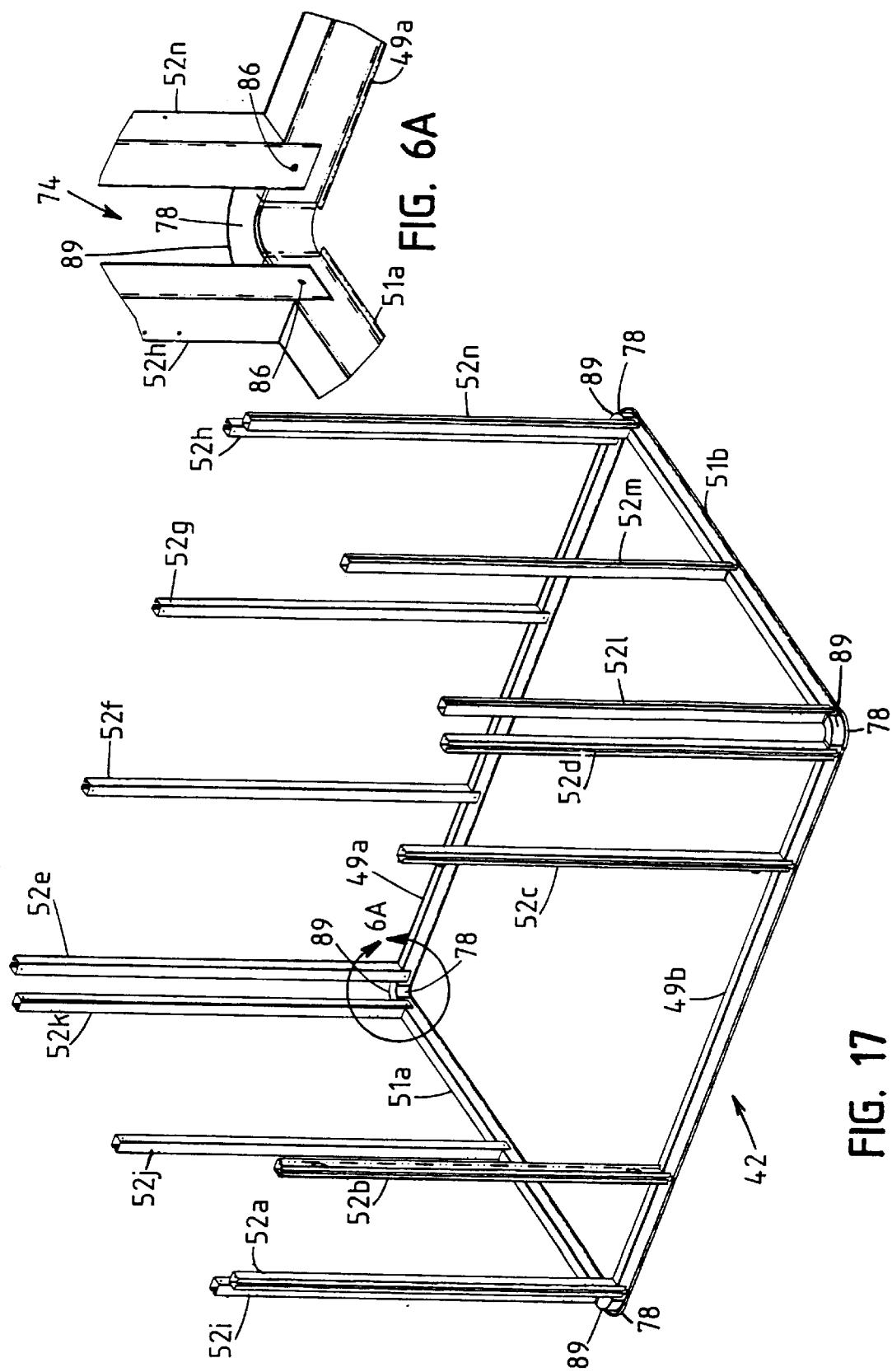

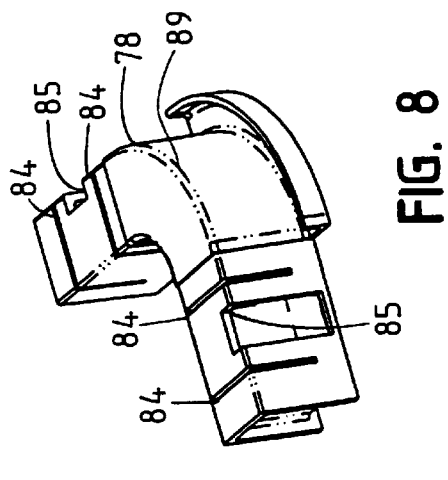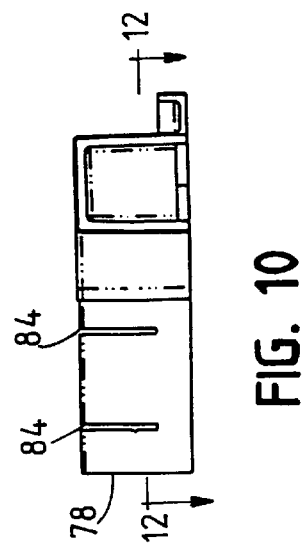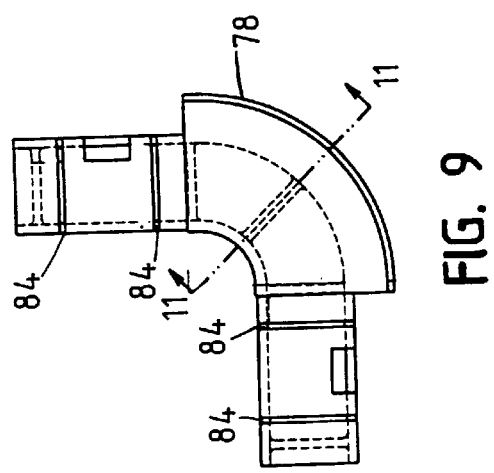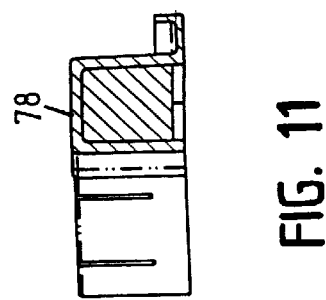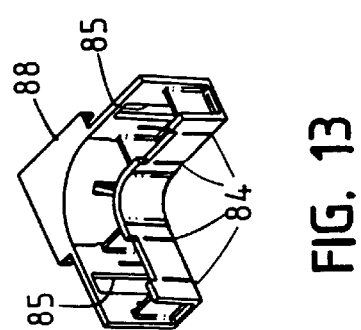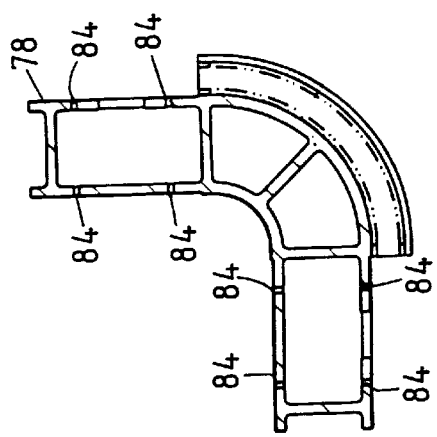

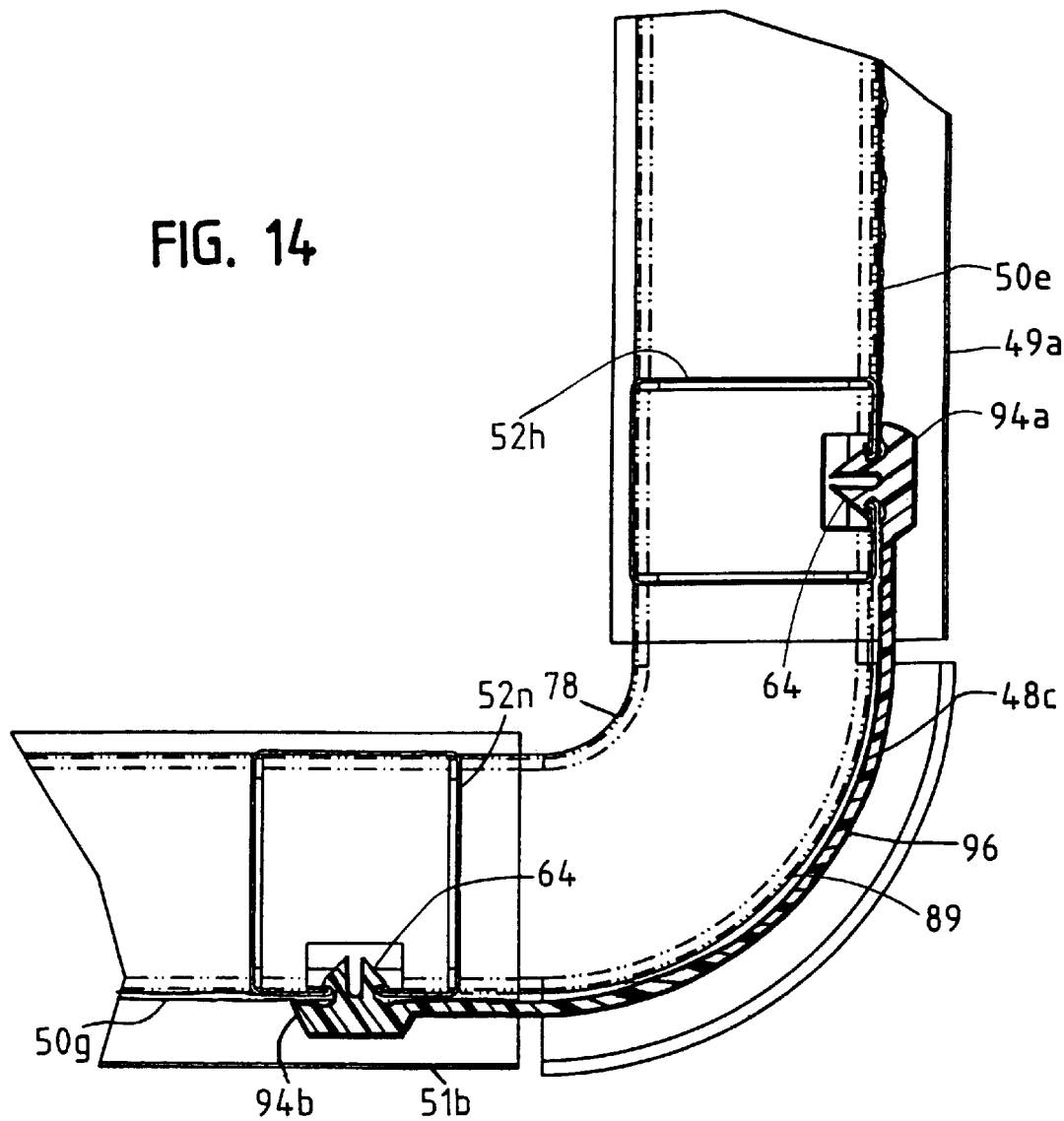

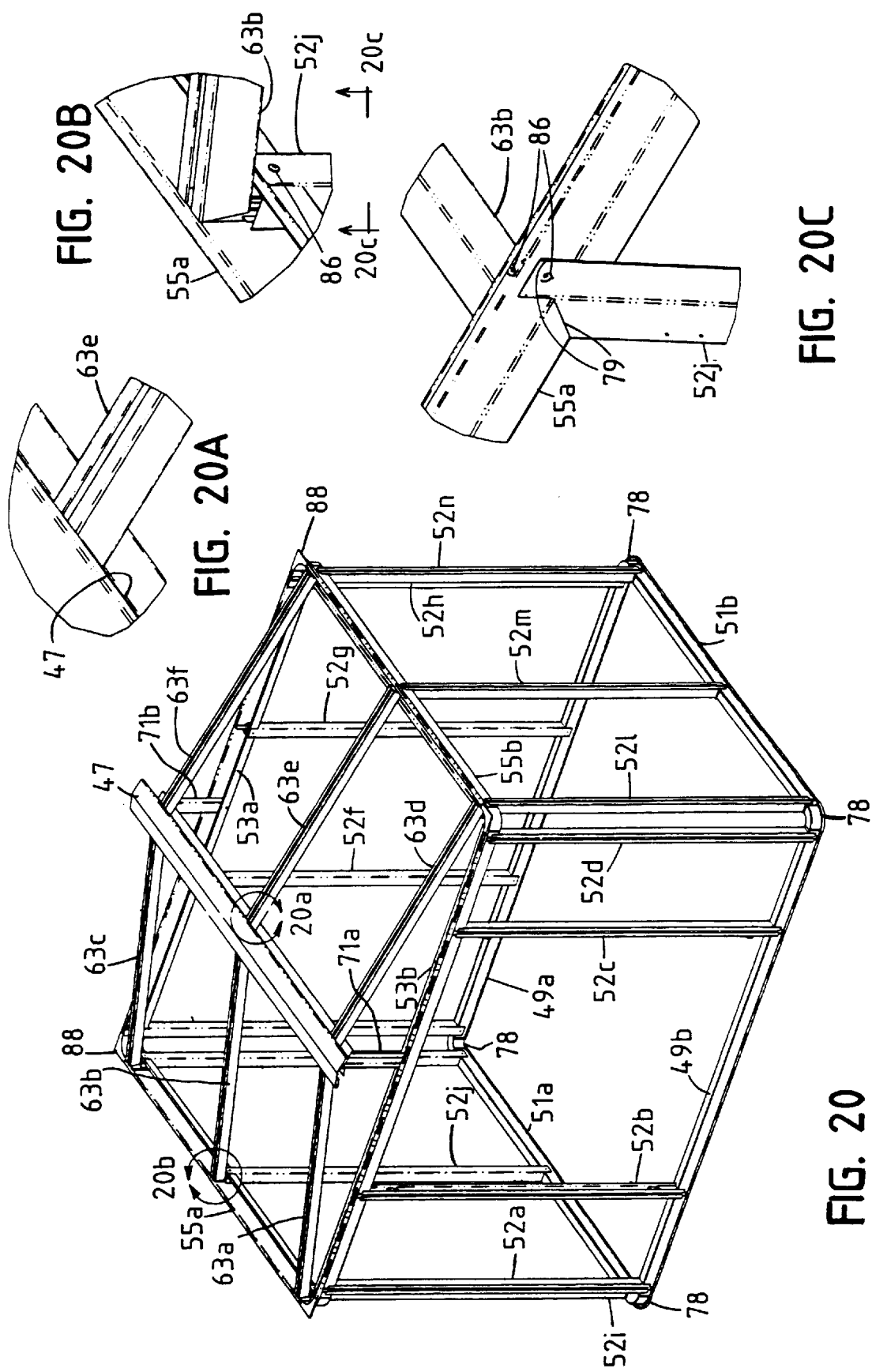

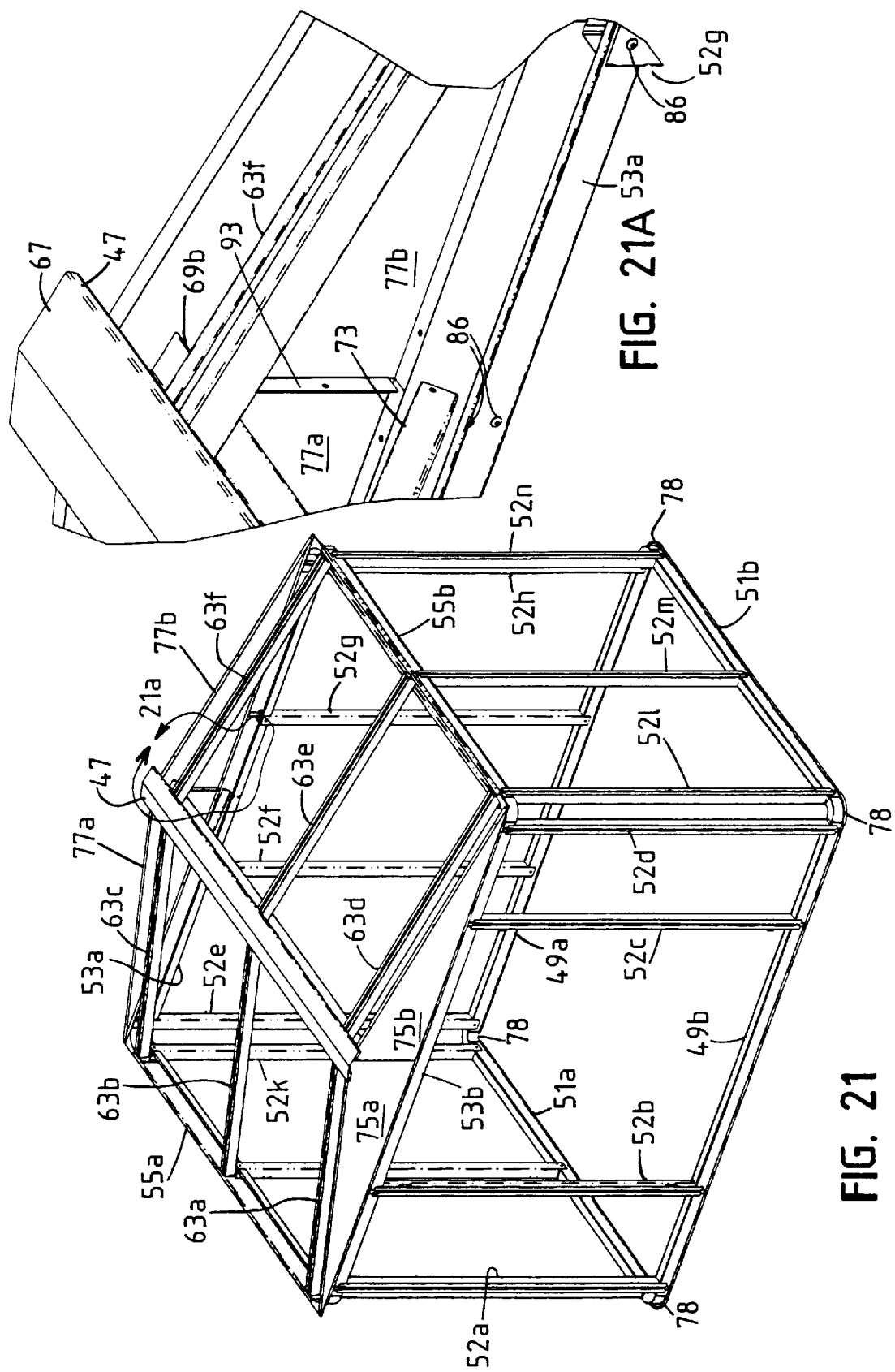

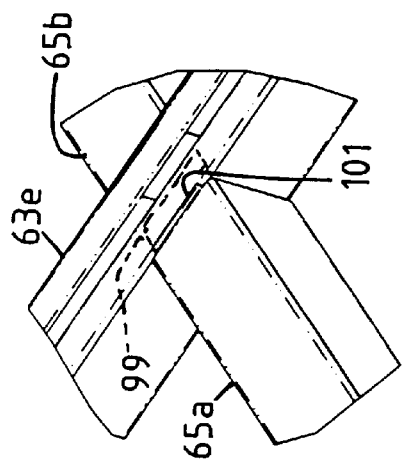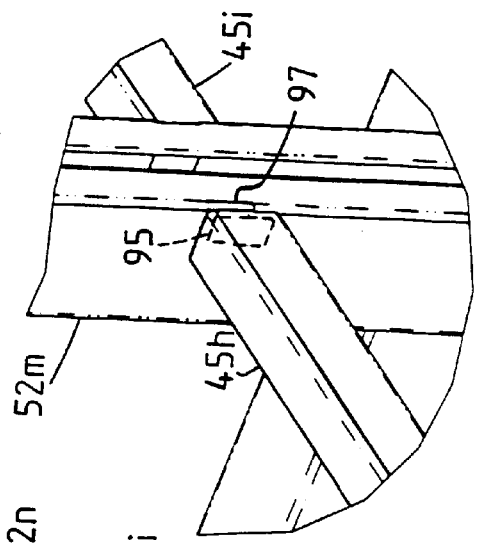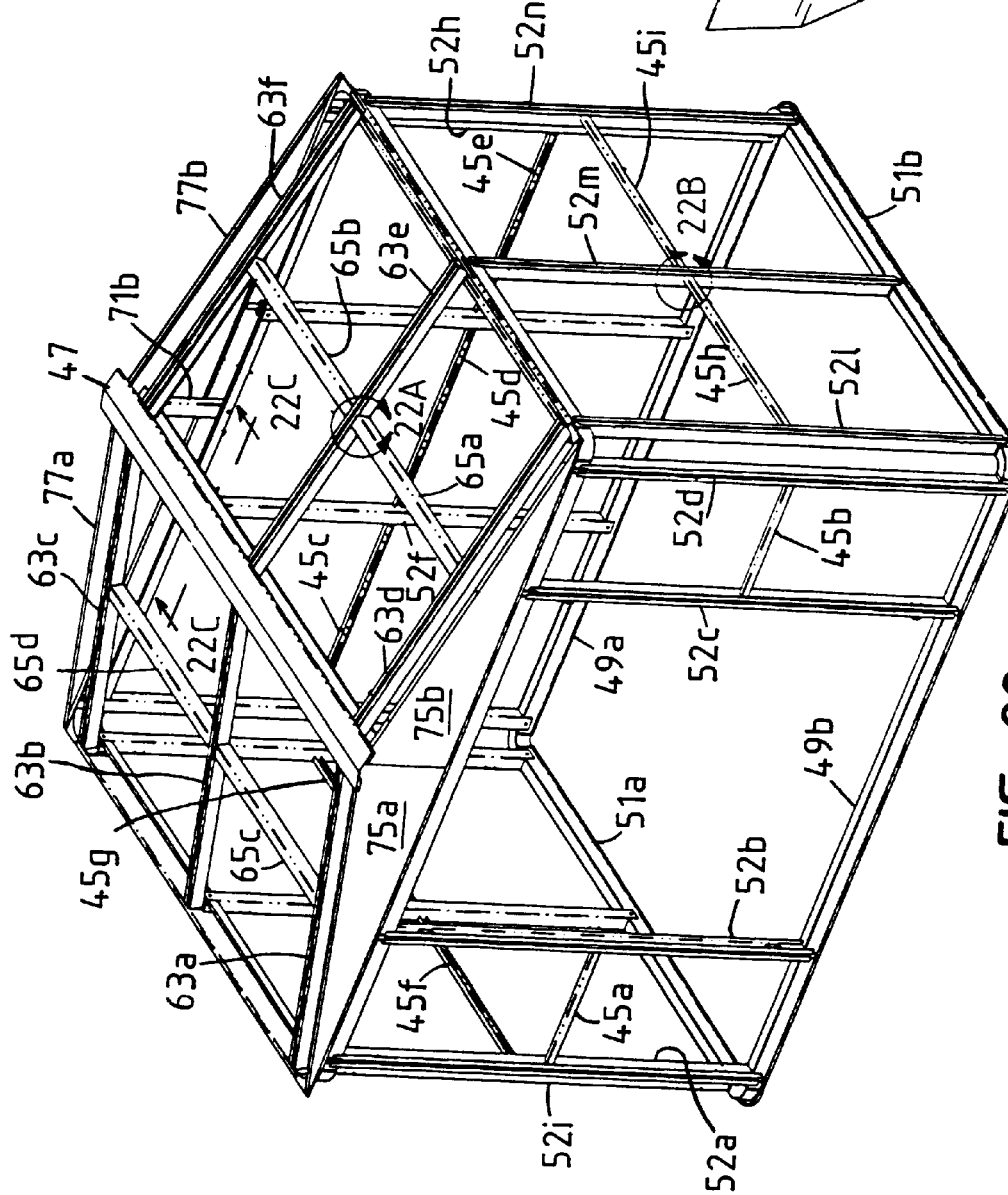

STORAGE BUILDING AND APPARATUS FOR CONSTRUCTING A STORAGE BUILDING

TECHNICAL FIELD

The present invention relates generally to building structures and, more particularly, to storage building structures and an apparatus for connecting load bearing members for storage building structures.

BACKGROUND ART

Prefabricated buildings, such as storage buildings or sheds, are intended to be purchased, assembled, and maintained by consumers who do not necessarily have the training or inclination to assemble and maintain such a structure, particularly if such assembly and/or maintenance requires a great deal of skill. Accordingly, prefabricated metal storage buildings have been developed that include pre-drilled fastener holes and other design features that simplify the assembly of such a storage building. However, such designs typically require a large number of threaded fasteners (e.g., 600 or more threaded fasteners), such as screws and bolts, for a typical storage building having a length of about eight feet (about 2.4 meters) and a width of about ten feet (about 3.0 meters). This large number of threaded fasteners causes the assembly, maintenance and disassembly of a storage building to be a time consuming and tedious task, especially for the typical consumer who is not accustomed to assembling storage buildings. Assembly could be simplified by providing relatively large portions of the storage building to the ultimate purchaser. For example each portion could comprise either an integral or preassembled major component (such as an entire wall). However, such an approach is inconsistent with the need to package the unassembled storage building in a relatively small box to enable the consumer to easily transport it from the place of purchase to the site on which the storage building is to be erected. Further, preassembly of separate components involves additional labor, increasing the overall cost of the storage building.

In addition, the large number of threaded fasteners, associated holes and inevitable nicks and scratches that occur during installation of the fasteners provide a large number of locations that can be undesirably prone to corrosion.

DISCLOSURE OF THE INVENTION

In accordance with one aspect of the present invention, an apparatus is provided for supporting a wall panel having an acute dihedral angle edge portion that is preferably a U-shaped edge. The apparatus comprises a support member having a flange portion that terminates in a support member edge substantially parallel to the acute dihedral angle edge portion. The support member edge is adapted to be received by the acute dihedral angle edge portion and means are provided for securing the acute dihedral angle edge portion against the support member edge.

In accordance with another aspect of the present invention, an apparatus is provided for connecting structural members. The apparatus comprises a first structural member having one or more slots therein and a second structural member having one or more flange portions, each adapted to engage one of the slots. Means are provided for locking the one or more flange portions in engagement with the slots.

A storage building constructed primarily from sheet metal parts using the connecting apparatuses in accordance with the present invention can be assembled with less complexity and using dramatically fewer threaded fasteners than prior sheet metal storage buildings. Accordingly, the present invention results in a low cost storage building that is easy to assemble and maintain.

Other features and advantages are inherent in the apparatus claimed and disclosed or will become apparent to those skilled in the art from the following detailed description in conjunction with the accompanying drawings.

BRIEF DESCRIPTION OF THE DRAWINGS

FIG. 6A is a fragmentary isometric view of the lower corner frame connection arrangement of FIG. 6;

FIG. 8 is an isometric view of a lower frame corner connecting member in accordance with the present invention;

FIG. 9 is a plan view of the lower frame corner connecting member of FIG. 8;

FIG. 10 is a front elevational view of the lower frame corner connecting member of FIG. 8;

FIG. 11 is a cross-sectional view of the lower frame corner connecting member of FIG. 8, taken generally along lines 11—11 of FIG. 9;

FIG. 12 is a cross-sectional view of the lower frame corner connecting member of FIG. 8, taken generally along lines 12—12 in FIG. 10;

FIG. 13 is an isometric view of an upper frame corner connecting member in accordance with the present invention;

FIG. 14 is a fragmentary cross-sectional view of a corner panel connecting member, taken generally along lines 14—14 of FIG. 4;

FIG. 17 is an isometric view of the base frame assembly and vertical support members in accordance with the present invention;

FIG. 20 is an isometric view of the base frame assembly, the vertical support members, the upper frame assembly, the roof ridge assembly and roof rafters in accordance with the present invention;

FIG. 20A is an enlarged fragmentary isometric view of a roof rafter and the roof ridge assembly in accordance with the present invention;

FIG. 20B is an enlarged fragmentary isometric view of a roof rafter, an upper frame member and a vertical support member in accordance with the present invention;

FIG. 20C is an enlarged fragmentary isometric view, taken generally along lines 20C—20C of FIG. 20B;

FIG. 21 is an isometric view of the base frame assembly, the vertical support members, the upper frame assembly, the roof ridge assembly, the roof rafters and front and rear gable members in accordance with the present invention;

FIG. 21A is an enlarged fragmentary isometric view of the roof ridge assembly and the rear gable members in accordance with the present invention;

FIG. 22 is an isometric view of the base frame assembly, the vertical support members, the upper frame assembly, the roof ridge assembly, the roof rafters, the front and rear gable members and roof and wall midspan support members in accordance with the present invention;

FIG. 22A is an enlarged fragmentary isometric view of a roof rafter and a roof midspan support member;

FIG. 22B is an enlarged fragmentary isometric view of a vertical support member and a wall midspan support member;

BEST MODE FOR CARRYING OUT THE INVENTION

Figure 1:
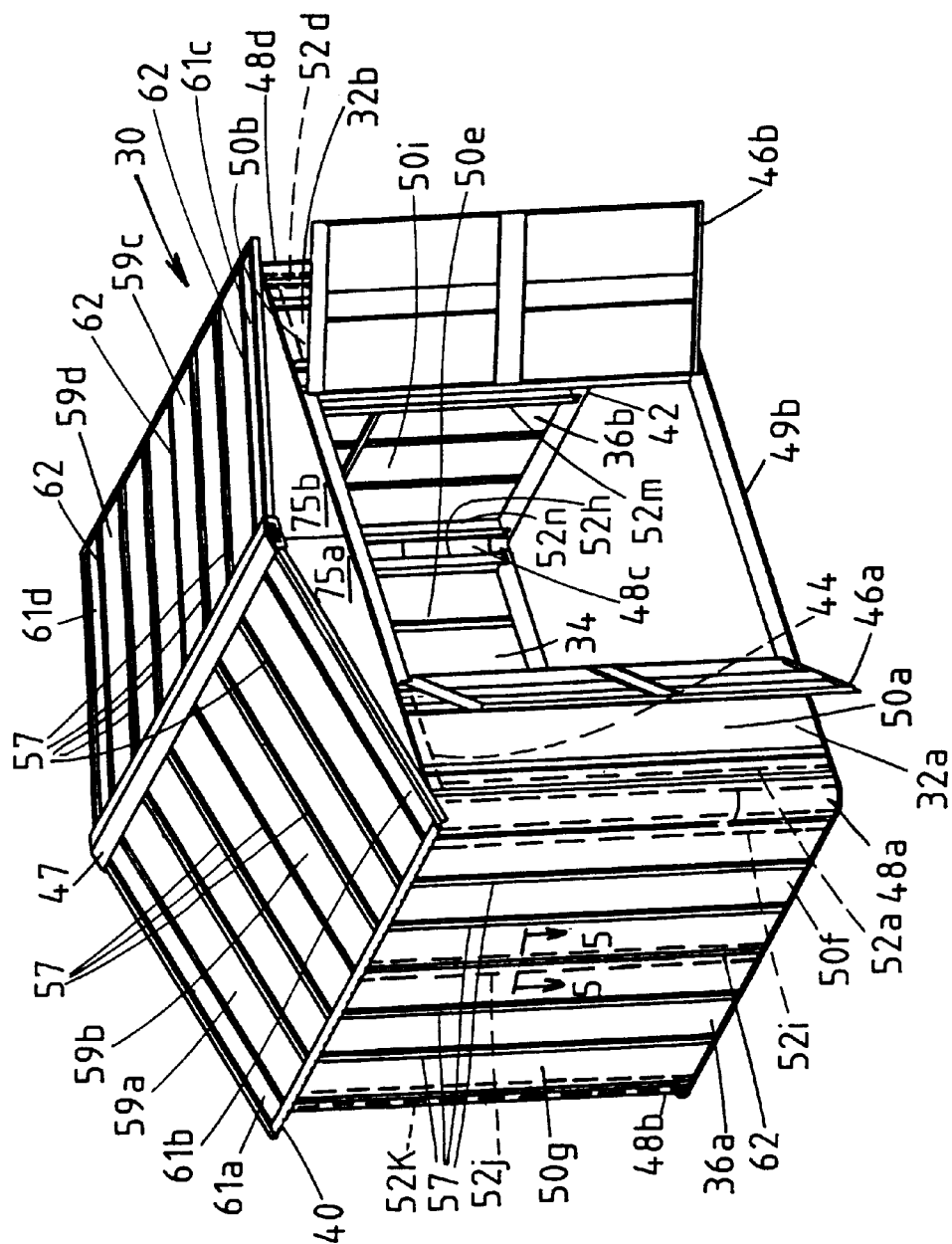
FIG. 1 is an isometric view of a storage building constructed in accordance with the present invention.
Figure 2:
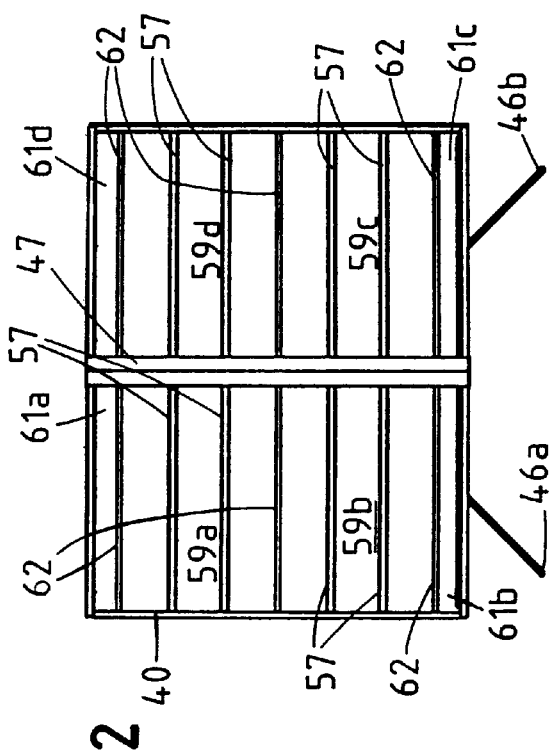
FIG. 2 is a plan view of the storage building of FIG. 1.
Figure 3:
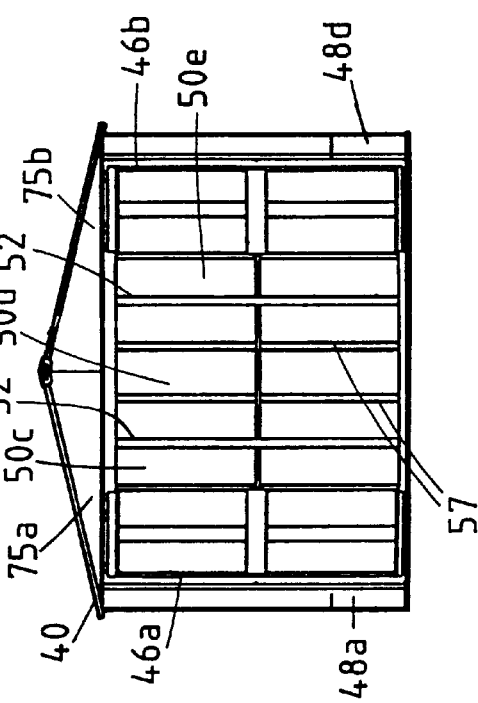
FIG. 3 is a front elevational view of the storage building of FIG. 1.

With reference to FIGS. 1–4, an exemplary storage building, generally designated 30, constructed in accordance with the present invention, includes a first front wall 32a, a second front wall 32b, a rear wall 34, a first side wall 36a and a second side wall 36b. The storage building 30 further includes a roof 40, a base frame 42, an upper frame 44, a first door 46a and a second door 46b. The storage building 30 has a generally rectangular floor plan, with first, second, third and fourth curved corner panel connecting members, 48a, 48b, 48c and 48d, respectively, defining the corners thereof. The storage building has a width (measured along the rear wall 34) of about 96.5 inches, a length (measured along one of the side walls 36a and 36b) of about 73.1 inches, a wall height of about 62.0 inches, and a total height (from the ground to the top of the roof 40) of about 73.8 inches.

Figure 16:
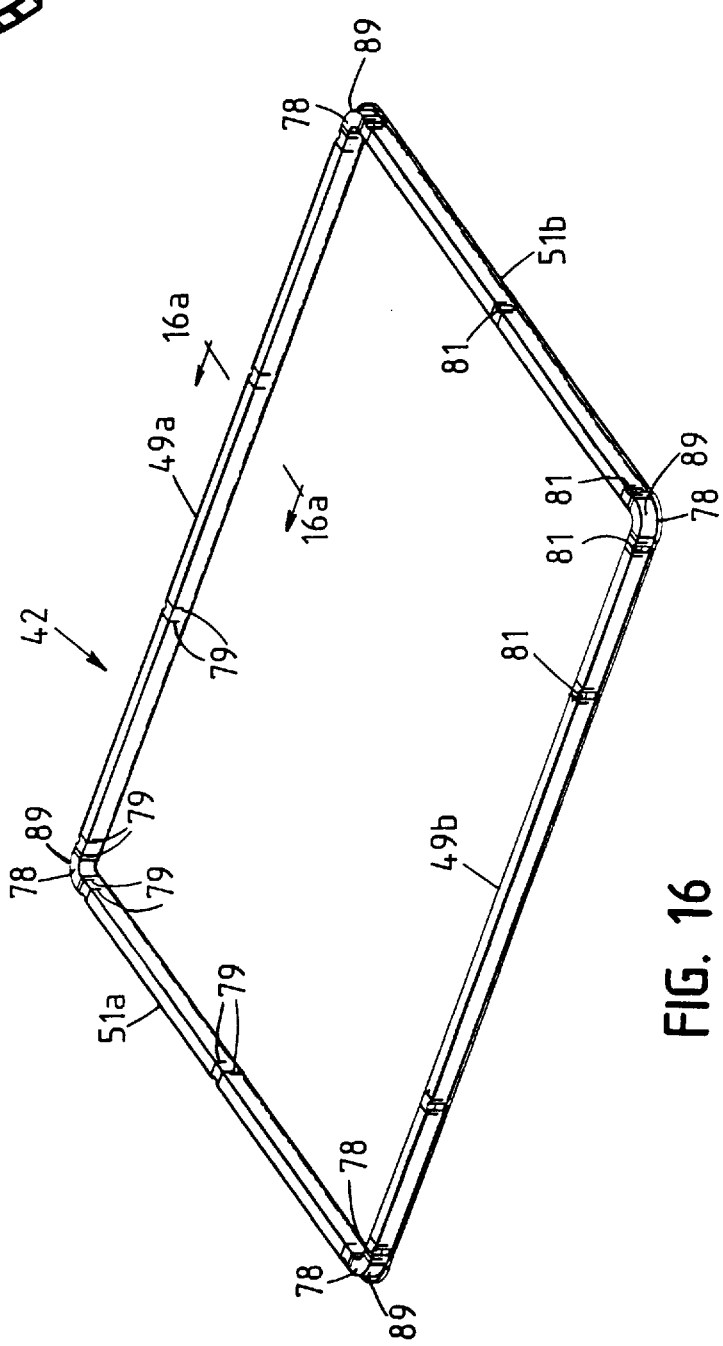
FIG. 16 is an isometric view of a base frame assembly in accordance with the present invention.

The base frame 42 includes a rear horizontal lower frame member 49a, a front horizontal lower frame member 49b, a first side horizontal lower frame member 51a and a second side horizontal lower frame member 51b (shown best in FIG. 16). Similarly, the upper frame 44 includes a rear horizontal upper frame member 53a, a front horizontal upper frame member 53b, a first side horizontal upper frame member 55a and a second side horizontal upper frame member 55b (shown best in FIG. 18).

Each front wall 32a, 32b, comprises a front wall panel, 50a and 50b, respectively (FIG. 1), a horizontal midspan wall support member 45a and 45b, respectively (FIG. 22), and two vertical support members 52a, 52b, and 52c, 52d, respectively. Each of the front wall panels 50a and 50b has a width of about 17.7 inches. The rear wall 34 comprises three rear wall panels, 50c, 50d and 50e (FIG. 3), each having a width of about 28.5 inches, three horizontal midspan wall support members 45c, 45d and 45e (FIG. 22) and four vertical support members 52e, 52f, 52g and 52h. The first side wall 36a comprises two side wall panels, 50f and 50g (FIG. 1), each having a width of about 31.2 inches, two horizontal midspan wall support members 45f and 45g (FIG. 22) and three vertical support members 52i, 52j and 52k. The second side wall 36b comprises two side wall panels, 50h and 50i (FIG. 4), each having a width of about 31.2 inches, two horizontal midspan wall support members 45h and 45i and three vertical support members 52l, 52m and 52n. Each of the wall panels 50a–50i has a height of about 61.5 inches.

Figure 5:
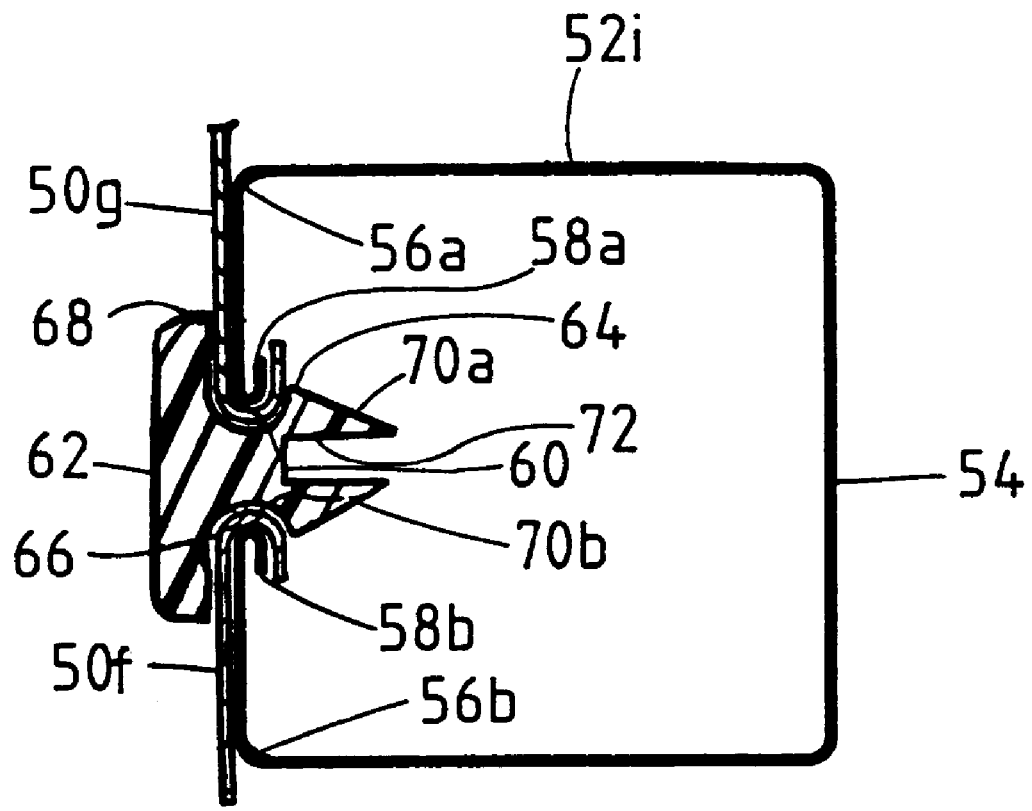
FIG. 5 is a cross-sectional view of a vertical support member, generally taken along lines 5—5 of FIG. 1.

As seen in FIG. 5, each of the vertical support members 52a–52n is made from roll-formed steel having a thickness of about 0.017 inches (about 0.43 mm) and has a C-shaped cross-sectional geometry with a web portion 54 that connects a first L-shaped flange portion 56a to a second L-shaped flange portion 56b. Each of the vertical support members 52a–52n has a height of about 59.6 inches. The L-shaped flange portions 56a and 56b terminate at first and second support member edges 58a, 58b, respectively. Preferably, about 0.10 inches (about 2.5 mm) of each of the support member edges is hemmed with a bend radius of about 0.040 inches (about 1.0 mm).

Figure 4:
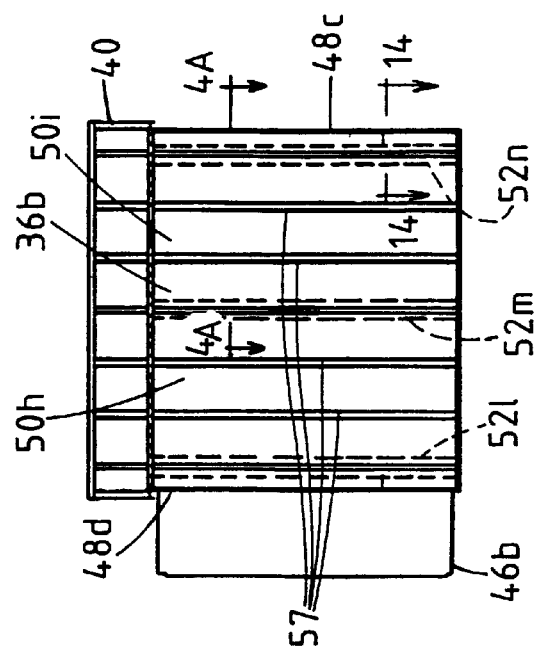
FIG. 4 is a side elevational view of the storage building of FIG. 1.
Figure 4A:
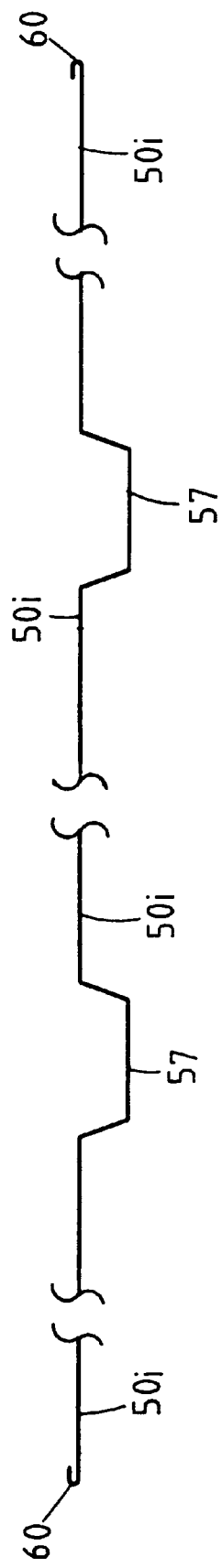
FIG. 4A is a cross-sectional view of a side wall panel of the storage building of FIG. 1, generally taken along lines 4A—4A of FIG. 4.

Each of the wall panels 50a–50i is preferably constructed from sheet metal, preferably having a thickness of about 0.0088 inches (about 0.22 mm). Alternatively, the wall panels 50a–50i could be constructed from suitably dimensioned plastic sheets. Each of the wall panels 50a–50i includes U-shaped vertical edges 60 that extend vertically the entire height of each of the wall panels 50a–50i, as seen in cross-section in FIG. 4A. Although preferably U-shaped, the vertical edges could be acceptable for the purposes of the invention by including any acute dihedral angle portion (i.e. a portion bent back beyond 90° from the nominal plane of the panel). Two hat-shaped stiffener portions 57 also extend vertically the entire height of each of the wall panels 50a–50i, as best seen in the cross-sectional view of the side wall panel 50i in FIG. 4A. Each U-shaped vertical edge 60 is adapted to be hooked onto one of the support member edges 58a or 58b, as seen in FIG. 5.

U-shaped vertical edges 60 of adjacent wall panels 50a–50i (for example, the wall panels 50f and 50g as seen in FIG. 5) are secured to one of the vertical support members 52a–52n by means of a clip member 62 that preferably (although not necessarily) extends over substantially the entire height of each of the vertical support members 52a–52n.

The roof 40 includes a roof ridge assembly 47 (FIG. 1), four primary roof panels 59a, 59b, 59c and 59d, four roof end panels 61a, 61b, 61c and 61d, six rafter members 63a, 63b, 63c, 63d, 63e and 63f (FIG. 20) and four rafter midspan support members 65a, 65b, 65c and 65d (FIG. 22). The primary roof panels 59a–59d and the roof end panels 61a–61d are each attached to the rafter members 63a–63f by means of clip members 62, in a manner similar to that by which the wall panels 50a–50i are secured to the vertical support members 52a–52n.

Figure 22C:
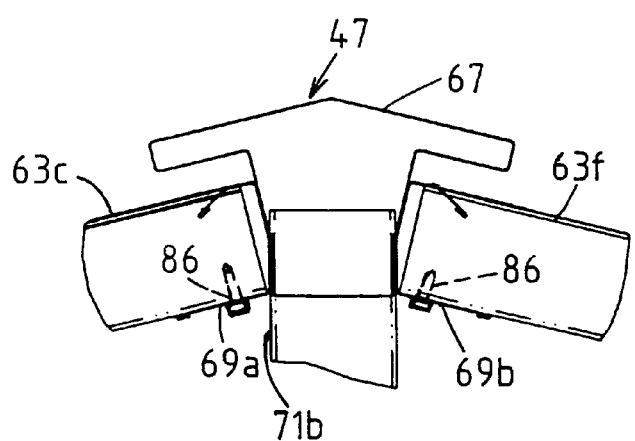
FIG. 22C is a cross-sectional view of a roof ridge assembly, taken generally along lines 22C—22C of FIG. 22.

The roof ridge assembly 47, shown in FIGS. 22 and 22C, includes a ridge cap member 67 made from sheet metal having a thickness of about 0.016 inches (about 0.41 mm) that extends substantially along the entire length of the storage building 30 (from front to back) and two ridge cap support members 69a and 69b rigidly attached thereto (i.e., by rivets, not shown) and made from sheet metal having a thickness of about 0.023 inches (about 0.58 mm) that also extend substantially along the entire length of the storage building 30. The roof ridge assembly 47 further includes a front roof post 71a, a rear roof post 71b and a diagonal rear roof brace 73, each of which is pivotally attached to the ridge cap support members 69a and 69b (i.e., by rivets, not shown). Accordingly, the front roof post 71a, the rear roof post 71b and the diagonal rear roof brace 73, each having a channel-shaped cross-sectional geometry, can be stowed between the ridge cap support members 69a and 69b for shipping.

The roof 40 is attached to the upper frame 44 and to the roof ridge assembly 47 in a conventional manner (i.e., using threaded fasteners to secure the rafter members 63a–63f to the side horizontal upper frame members 55a and 55b and to the ridge cap support members 69a and 69b). The roof is also supported by front gable panels 75a and 75b, rear gable panels 77a and 77b, the front roof post 71a, the rear roof post 71b and the diagonal rear roof brace 73, all of which are attached to the horizontal upper frame members 53a and 53b in a conventional manner (i.e., using threaded fasteners).

As seen in FIG. 14, each of the corner panel connecting members 48a–48d comprises two clip portions 94a and 94b, joined together by an integral flexible web portion 96. Each of the corner panel connecting members 48a–48d is connected by the clip portions 94a, 94b between a pair of adjacent wall panels 50a and 50f, 50g and 50c, 50e and 50i, or 50h and 50b, respectively, and vertical support members 52a and 52i, 52k and 52e, 52h and 52n, or 52l and 52d. For example, FIG. 14 illustrates the connection of the corner panel connecting member 48c with the wall panels 50g and 50e and vertical support members 52h and 52n. Each of the clip members 62 and each of the corner panel connecting members 48a–48d may be made from an extruded thermoplastic material, such as low density polyethylene, or may be made from metal.

As seen in cross-section in FIG. 5, each clip member 62 includes a head portion 64, a neck portion 66 and a shoulder portion 68. The head portion 64 includes first and second tapered fingers 70a and 70b, respectively, and a U-shaped gap 72 between the tapered fingers 70a and 70b.

The clip portions 94a, 94b of the corner panel connecting members 48a–48d are preferably essentially identical to the clip members 62, the sole exception being the connection of the clip portions 94a, 94b to the integral flexible web portion 96.

In order to secure each of the wall panels 50a–50i to one of the support members 52a–52n, one of the U-shaped vertical edges 60 of one of the wall panels 50a–50i is first hooked over one of the first and second edges 58a, 58b of one of the vertical support members 52a–52n. Next, for intermediate vertical support members 52f, 52g, 52j and 52m (i.e., those vertical support members between two panels), one of the U-shaped vertical edges 60 of another of the wall panels 50a–50i is hooked to the second edge 58b of the vertical support member 52f, 52g, 52j or 52m. Then, the head portion 64 of one of the clip members 62 is inserted between the U-shaped vertical edges 60 that are hooked onto the first and second edges 58a and 58b. As the head portion 64 of the clip member 62 enters the region between the U-shaped vertical edges 60, the first and second tapered fingers 70a and 70b are deflected toward one another and the first and second edges 58a and 58b flex slightly apart from one another. As the neck portion 66 of the clip member 62 reaches the region between the U-shaped vertical edges 60, the first and second tapered fingers 70a and 70b are released to "snap" outwardly as the first and second edges 58a and 58b also "snap" inwardly toward one another, resulting in the clip member 62 being compressed in a stable position between the U-shaped vertical edges 60, thereby securing the U-shaped vertical edges 60 against the first and second edges 58a and 58b.

In those cases where one of the wall panels 50a, 50b, 50c, 50e, 50f, 50g, 50h or 50i is to be secured to an adjacent corner panel connecting member 48a–48d (for example, where the panel 50e is to be joined to the corner panel connecting member 48c as seen in FIG. 14), the head portion 64 of the appropriate clip portion 94a is inserted into the space between the first and second edges 58a, 58b after the U-shaped edge 60 of the panel 50e is hooked over the edge 58b. (In this case there is no U-shaped edge hooked over the edge 58a). Installation of the clip portion 94a thereafter proceeds as discussed above in connection with the clip member 62 to secure the corner panel connecting member 48c to the support member 52h and the panel 50e.

Each of the horizontal frame members 49a, 49b, 51a, 51b, 53a, 53b, 55a and 55b includes transverse slots 79 to receive the vertical support members 52a–52n, and openings 81 to receive ends of the head portions 64 of the clip members 62.

Figure 6:
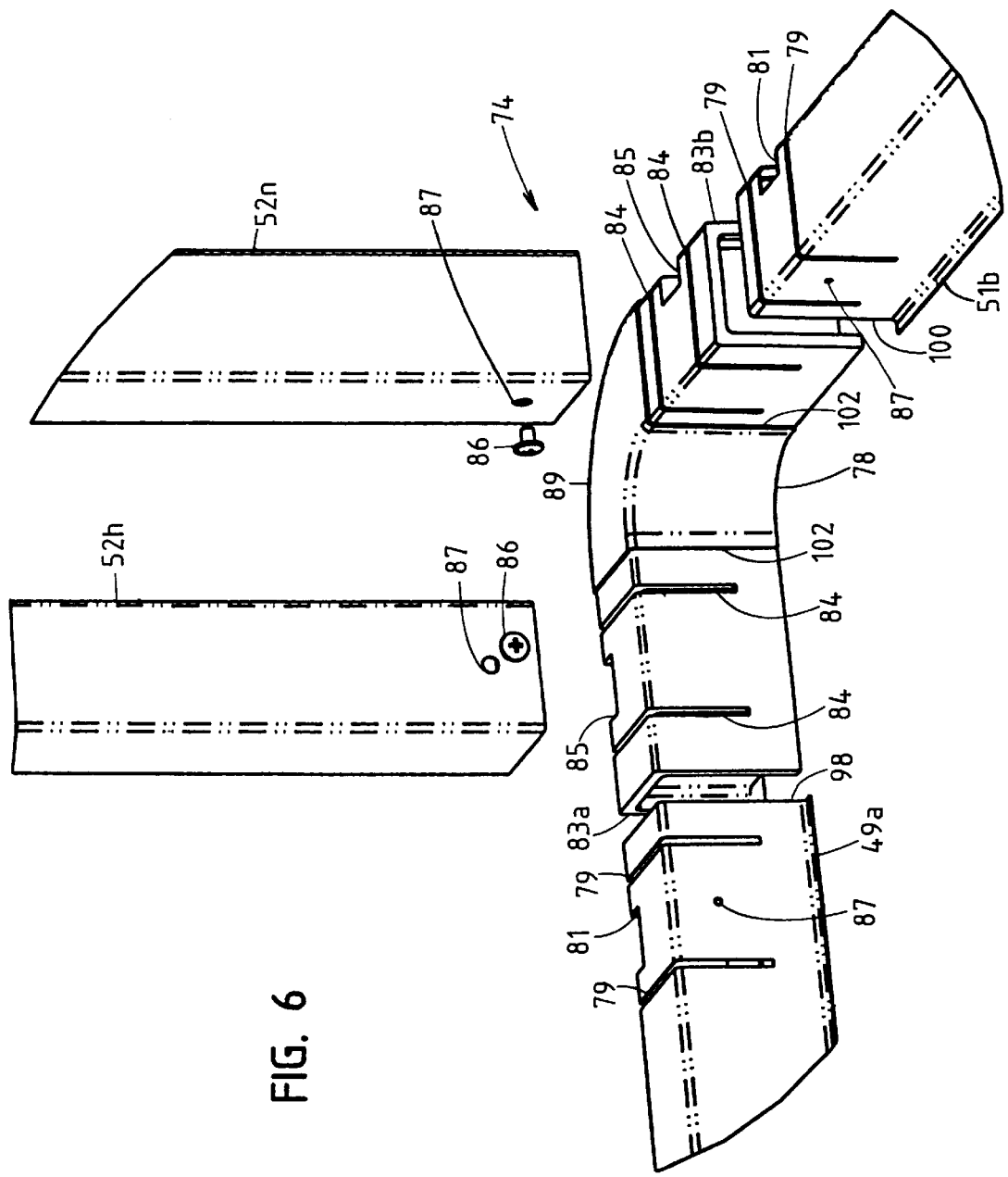
FIG. 6 is an exploded, fragmentary isometric view of a lower corner frame connection arrangement in accordance with the present invention.

FIG. 6 shows a lower corner frame connection arrangement 74 in an unassembled configuration. FIG. 6A shows the lower corner frame connection arrangement 74 in an assembled configuration. One lower corner frame connection arrangement 74 is located at each corner of the base frame 42 below each of the corner panel connecting members 48a–48d. An upper corner frame connection arrangement 76 (seen in FIG. 7 in an assembled configuration) is located at each corner of the upper frame 44 above each of the corner panel connecting members 48a–48d.

Figure 16A:
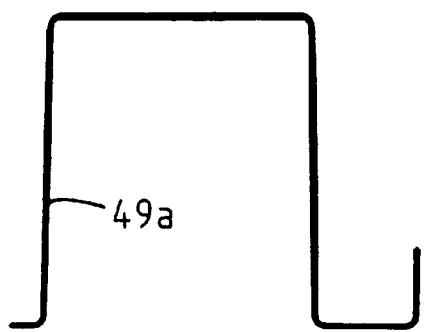
FIG. 16A is a cross-sectional view of a lower frame member, taken generally along lines 16A—16A of FIG. 16.

As seen in FIG. 6, the lower corner frame connection arrangement 74 comprises the lower frame corner connecting member 78, the rear horizontal lower frame member 49a, the side horizontal lower frame member 51b and two vertical support members 52h and 52n. The lower frame corner connecting member 78 includes transverse slots 84 that align with the transverse slots 79 in the horizontal lower frame members 49a and 51b to receive the vertical support members 52h and 52n. The lower frame corner connecting member 78 also includes openings 85 to receive the lower ends of the head portions 64 of the clip members 62. Each horizontal lower frame member 49a, 49b, 51a and 51b has a generally hat-shaped cross-sectional geometry, as seen in the cross-sectional view of the horizontal lower frame member 49a in FIG. 16A, and is constructed from roll-formed steel having a thickness of about 0.017 inches (about 0.43 mm). The lower frame corner connecting member 78 is shown separately in FIGS. 8 through 12 and is preferably made from a thermoplastic material, such as low density polyethylene, by injection molding.

With further reference to FIGS. 6 and 6A, to assemble the lower corner connection arrangement 74, each horizontal lower frame member 49a and 51b is mated with the lower frame corner connecting member 78 by overlapping each lower frame member 49a and 51b atop respective ends 83a and 83b of the lower frame corner connecting member 78 such that an edge 98 and 100 of each lower frame member 49a and 51b, respectively, abuts a respective shouldered surface 102 of the lower frame corner connecting member 78. Once each horizontal lower frame member 49a and 51b is mated in this fashion with the lower frame corner connecting member 78, the transverse slots 79 in each of the horizontal lower frame members 49a and 51b are aligned with corresponding transverse slots 84 in the lower frame corner connecting member 78. Next, the two vertical support members 52h and 52n are inserted into the aligned transverse slots 79 and 84, and each of the vertical support members 52h and 52n is secured to the lower frame corner connecting member 78 and horizontal lower frame member 49a, 51b, respectively, with a self-tapping threaded fastener 86 that passes through holes 87 in the horizontal lower frame members 49a, 51b and the vertical support members 52h, 52n and that bores a hole (not shown) in the lower frame corner connecting member 78. Of course, if desired, pilot holes (not shown) could be provided in the lower frame corner connecting member 78 and any suitable fastening means, such as a rivet, could be substituted for the self-tapping threaded fastener 86.

Figure 7:
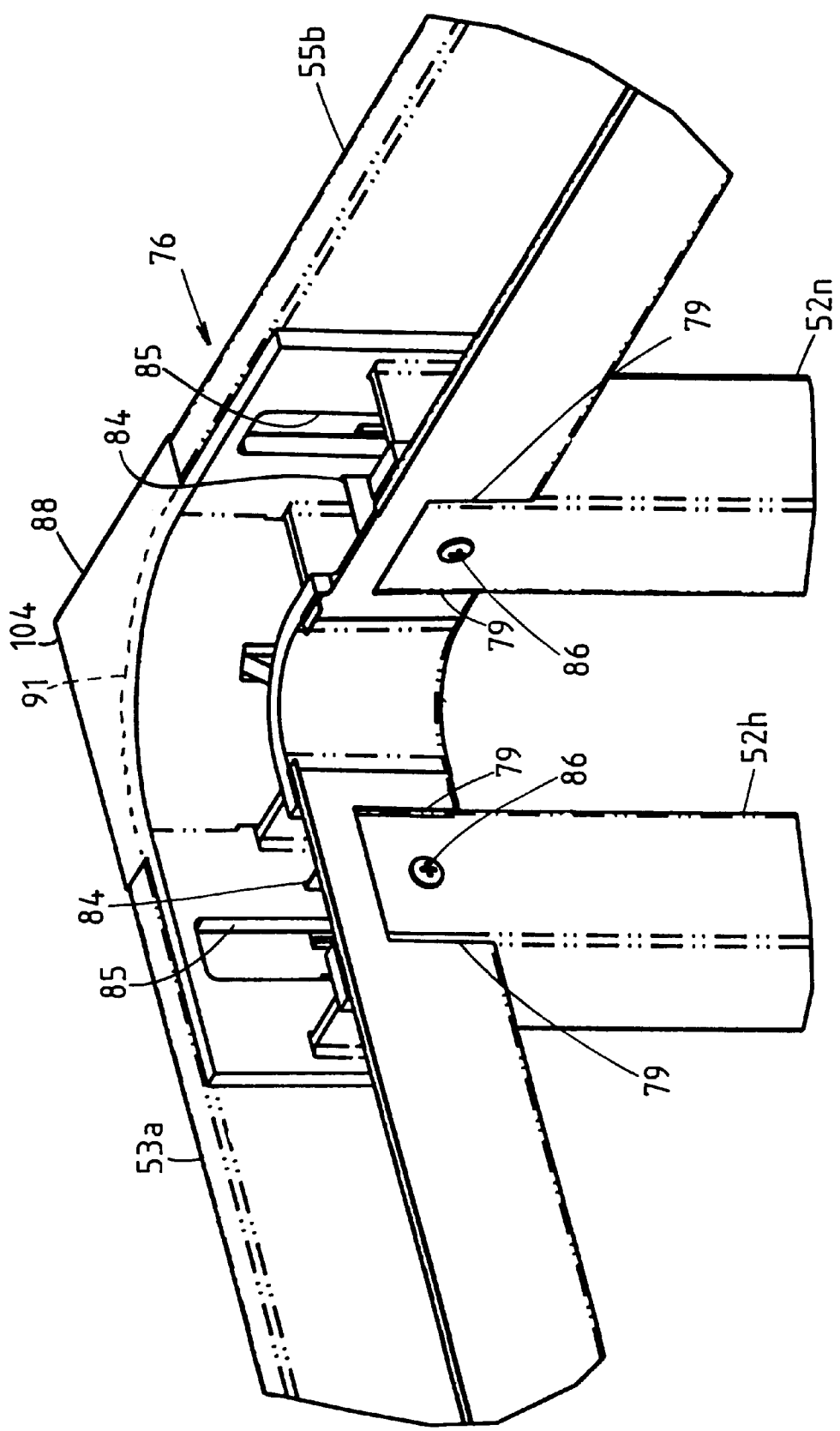
FIG. 7 is a fragmentary isometric view of an upper corner frame connection arrangement in accordance with the present invention.

As seen in FIG. 7, the upper corner frame connection arrangement 76 is essentially identical to the lower corner frame connection arrangement 74, and comprises an upper frame corner connecting member 88, the rear horizontal upper frame member 53a, the side horizontal upper frame member 55b, vertical support members 52h and 52n and self-tapping threaded fasteners 86.

The primary difference between the upper corner frame connection arrangement 76 and the lower corner frame connection arrangement 74 is the inclusion of a square corner horizontal extension 104 in the upper frame corner connecting member 88, which serves to merge with the roof end panels 61a–61d in the vicinity of the corners of the roof 40.

Each of the corner panel connecting members 48a–48d is nominally flat, but when installed, the flexible web portion 96 of each of the corner panel connecting members 48a–48d follows the contour of curved surfaces 89 and 91 of the lower frame corner connecting member 78 and the upper frame corner connecting member 88, respectively.

Figure 18A:
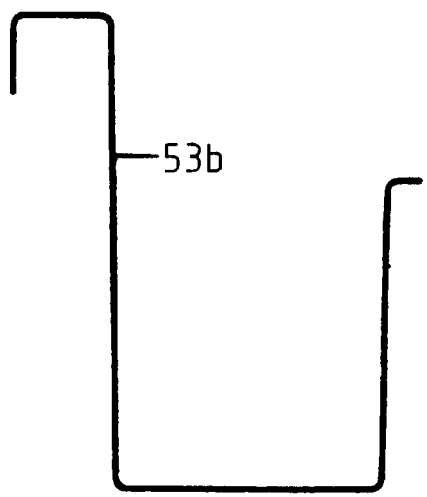
FIG. 18A is a cross-sectional view of an upper frame member, taken generally along lines 18A—18A of FIG. 18.

The horizontal upper frame members 53a and 55b each have a generally hat-shaped cross-sectional geometry, as seen in FIG. 18A, and are constructed from roll-formed steel having a thickness of about 0.017 inches (about 0.43 mm). The upper frame corner connecting member 88 is shown separately in FIG. 13.

Figure 15:
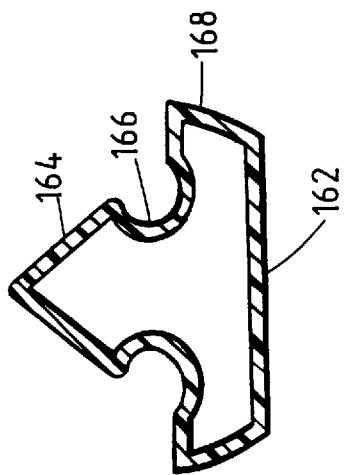
FIG. 15 is a cross-sectional view of an alternatively configured clip member in accordance with the present invention.

An alternatively configured clip member 162 is shown in cross-section in FIG. 15. Each clip member 162 includes a head portion 164, a neck portion 166 and a shoulder portion 168. The clip member 162 is similar to the clip member 62, except that instead of having a substantially solid cross-sectional geometry, the clip member 162 has a hollow cross-sectional geometry, being made from a vacuum formed extrusion having a wall thickness of about 0.040 inches (about 1.0 mm), and does not include the U-shaped gap 72 or the tapered fingers 70a or 70b.

FIGS. 16 through 22B depict a preferred assembly sequence for constructing the storage shed 20. The first step is to form the base frame 42 by setting the horizontal lower frame members 49a, 49b, 51a and 51b atop the lower frame corner connecting members 78, as seen in FIG. 16. Next, as seen in FIG. 17, the vertical support members 52a–52n are inserted into the transverse slots 79 in the horizontal lower frame members 49a, 49b, 51a and 51b and secured with self-tapping threaded fasteners 86.

Figure 18:
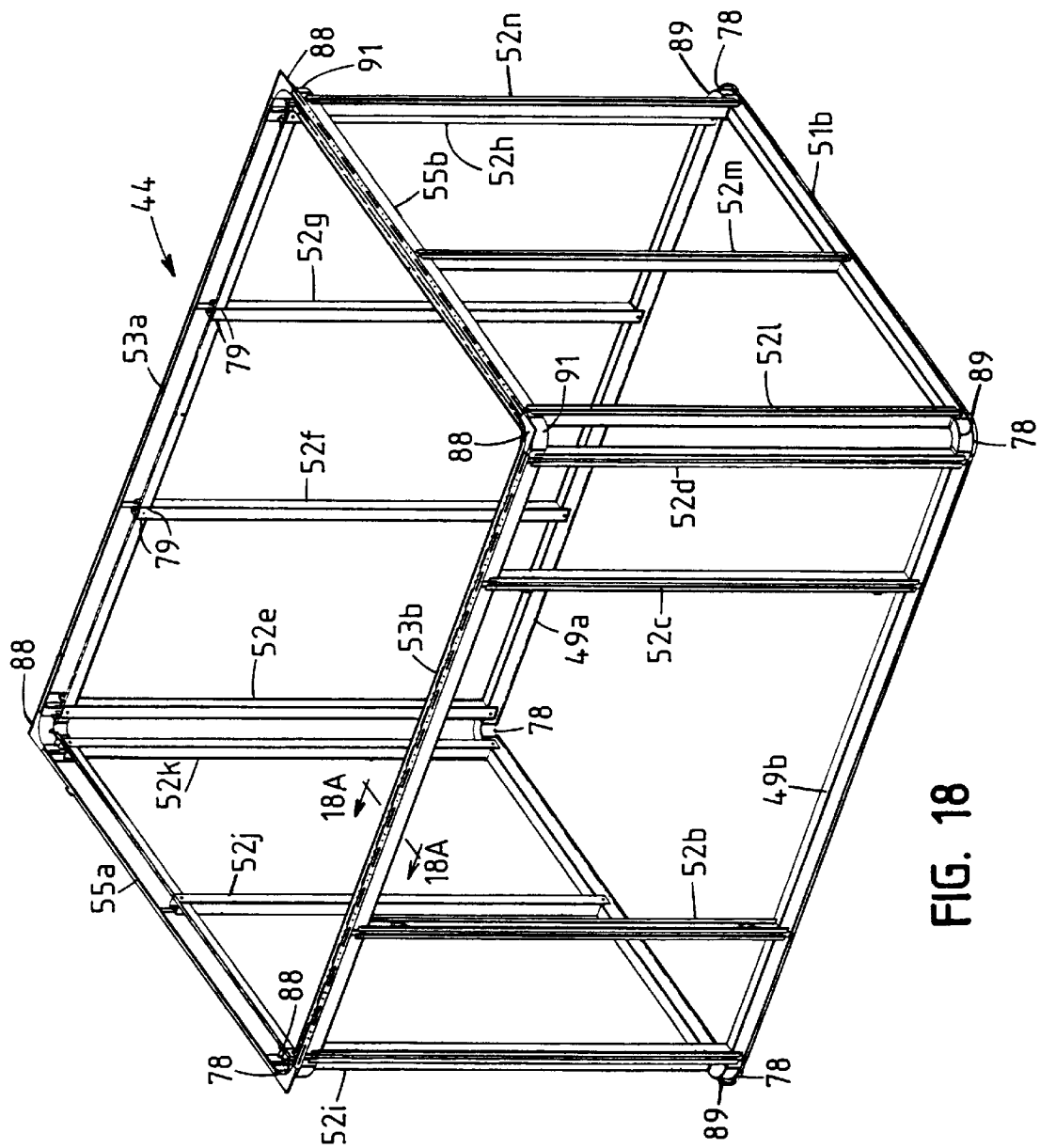
FIG. 18 is an isometric view of the base frame assembly, the vertical support members and an upper frame assembly in accordance with the present invention.
Figure 19A:
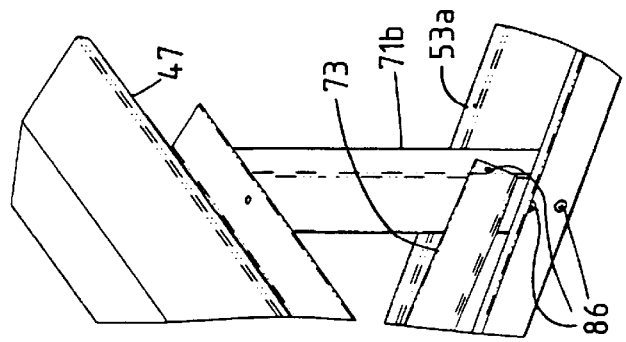
FIG. 19A is an enlarged fragmentary isometric view of a portion of the roof ridge assembly of FIG. 19.
Figure 19:
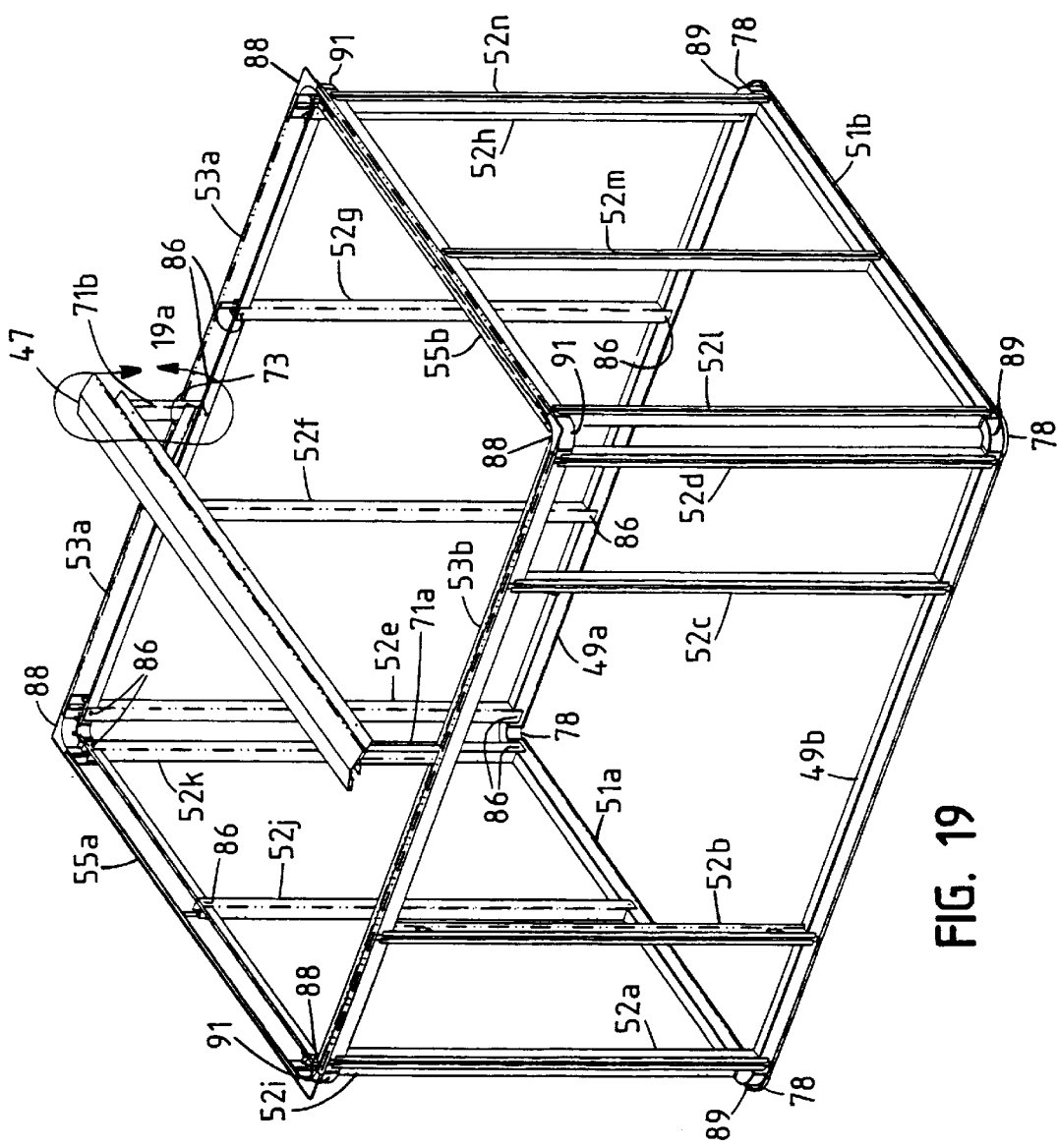
FIG. 19 is an isometric view of the base frame assembly, the vertical support members, the upper frame assembly and a roof ridge assembly in accordance with the present invention.

Next, as seen in FIG. 18, the upper frame 44 is set atop the vertical support members 52a–52n, which are inserted into the transverse slots 79 in the horizontal upper frame members 53a, 53b, 55a and 55b, and secured with self-tapping threaded fasteners 86. Once the upper frame 44 has been secured to the vertical support members 52a–52n, the roof ridge assembly 47 is secured to the upper frame 44. Specifically, as shown in FIGS. 19 and 19A, self-tapping threaded fasteners 86 are used to secure the front roof post 71a to the front horizontal upper frame member 53b, the rear roof post 71b to the rear horizontal upper frame member 53a and the diagonal rear roof brace 73 to the rear roof post 71b.

The next assembly step is the attachment of the rafter members 63a–63f to the side horizontal upper frame members 55a and 55b and to the ridge cap support members 69a and 69b in a conventional manner (i.e., using self-tapping threaded fasteners 86), as seen in FIGS. 20, 20A, 20B and 20C. After the rafter members 63a–63f have been installed, the front gable panels 75a, 75b and the rear gable panels 77a, 77b are secured to one another along a vertical flange 93 of each gable panel 75a, 75b, 77a and 77b (FIG. 21A). (The rear roof post 71b is not shown in FIGS. 21 and 21A for clarity). The front gable panels 75a, 75b and the rear gable panels 77a and 77b are also secured to the front and rear horizontal upper frame members 53b, 53a, respectively, using self-tapping threaded fasteners 86.

Once the gable panels 75a, 75b, 77a and 77b are in place, the horizontal midspan wall support members 45a–45i and the rafter midspan support members 65a–65d are installed, as shown in FIGS. 22, 22A and 22B. Each of the horizontal midspan wall support members 45a–45i has a notched flange 95 on each end thereof that is inserted into a corresponding axial slot 97 in each of two corresponding vertical support members 52a–52n. The horizontal midspan wall support members 45a–45i are then displaced downwardly so that the notched flanges 95 lock into position.

Similarly, each of the rafter midspan support members 65a–65d has a notched flange 99 on each end thereof that is inserted into a corresponding axial slot 101 in each of two corresponding rafter members 63a–63f. The rafter midspan support members 65a–65d are then displaced downwardly and outwardly (i.e., away from the roof ridge assembly 47) so that the notched flanges 99 lock into position.

The next assembly step is the attachment of the wall panels 50a–50i the attachment of the primary roof panels 59a–59d and the roof end panels 61a–61d, using the clip members 62 or 162 as described in detail above. Finally, the doors 46a, 46b may be secured to the front wall panels 50a and 50b respectively, in a conventional manner, e.g., using hinges (not shown).

Figure 23:
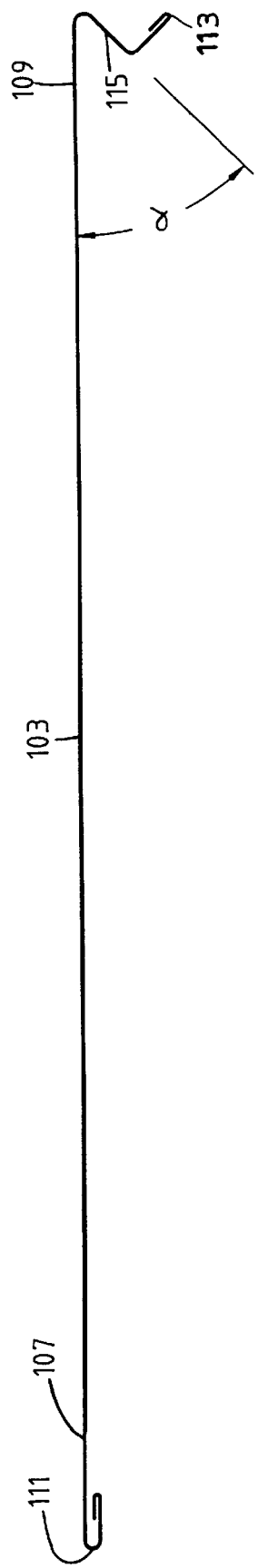
FIG. 23 is a cross-sectional view of an alternative sheet metal corner panel member in accordance with the present invention.
Figure 24:
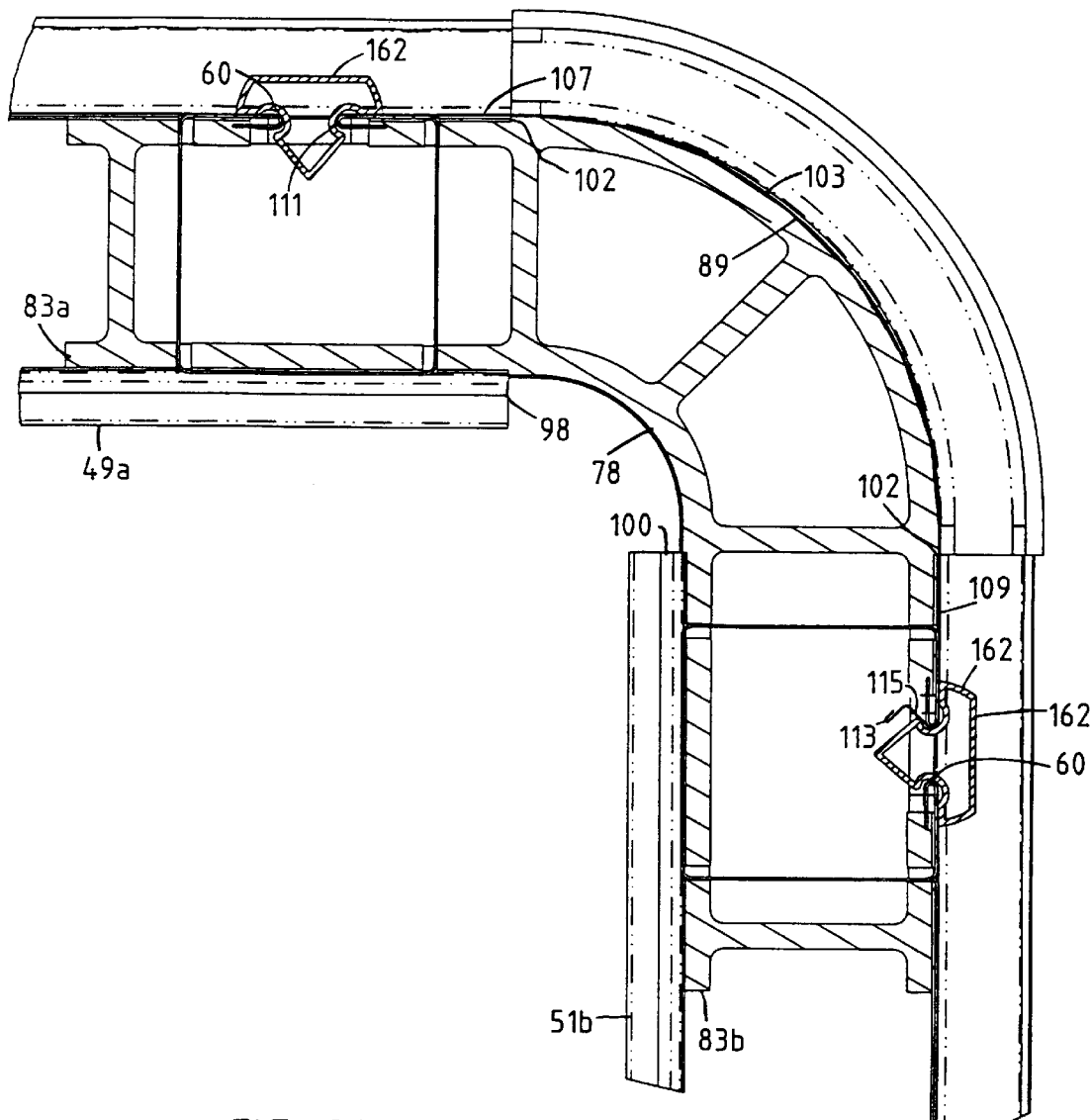
FIG. 24 is a cross sectional view, similar to FIG. 14, showing an alternative sheet metal corner panel assembly incorporating the alternative sheet metal corner panel member of FIG. 23.

In a preferred alternative to the corner panel connecting members 48a–48d, a sheet metal corner panel member 103 and a sheet metal corner panel assembly 105 are shown in FIGS. 23 and 24, respectively. The sheet metal corner panel member 103 is nominally substantially flat, as shown in FIG. 23, has a thickness of about 0.0088 inches (about 0.22 mm) and has a first end portion 107 and a second end portion 109. The first end portion 107 terminates in a U-shaped vertical edge 111 that is adapted to be hooked onto one of the support member edges 58a or 58b of one of the adjacent vertical support members 52a and 52i, 52k and 52e, 52h and 52n, or 52*l* and 52*d*. The second end portion 109 terminates in a vertical edge 113 that extends orthogonally from an acute dihedral angle portion 115 that is disposed at a nominal dihedral angle α of about 45° with respect to the nominal plane of the sheet metal corner panel member 103. The vertical edge 113 and the acute dihedral angle portion 115 are adapted to be flexed away from the nominal plane of the sheet metal corner panel member 103 (i.e., thereby increasing the dihedral angle α) so that the acute dihedral angle portion 115 can be inserted in between the support member edges 58*a* and 58*b* and "snap" into position, hooked around one of the support member edges 58*a* or 58*b*, as illustrated in FIG. 24, for example, with regard to the connection of the sheet metal corner panel member 103 to the wall panels 50*g* and 50*e* and vertical support members 52*h* and 52*n*. When installed as shown in FIG. 24, the sheet metal corner panel member 103 follows the contour of the curved surfaces 89 and 91 of the lower frame corner connecting member 78 and the upper frame corner connecting member 88, respectively. The sheet metal corner panel member 103 is secured to each of the vertical support members 52*h* and 52*n* by a clip member 162.

The storage building 30 constructed in accordance with the present invention is a lightweight, strong and inexpensive building that is relatively simple to assemble and that can be packaged in relatively compact shipping containers for transport from the place of purchase to the site on which the storage building is to be erected. The primary reason for the simplicity of assembly is the dramatic reduction in the number of threaded fasteners required due to the use of the unique panel connection and frame corner connection arrangements used in accordance with the present invention. In addition, the reduced reliance on threaded fasteners, as well as the use of plastic materials makes the storage building 30 more resistant to corrosion than a conventional all-metal building.

Numerous modifications and alternative embodiments of the present invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. An apparatus comprising:
   a first elongate structural member having one or more transverse slots therein;
   a second elongate structural member having one or more flange portions, each flange portion engaging one of the slots;
   means for locking the one or more flange portions in engagement with the slots; and
   a connecting member overlapping with the first elongate structural member, the connecting member having transverse connecting member slots therein align with the transverse slots in the first elongate structural member when the connecting member is overlapped with the first elongate structural member.

2. The apparatus of claim 1, wherein the locking means comprises a threaded fastener.

3. The apparatus of claim 1, wherein the locking means comprises a self-tapping screw.

4. A storage building comprising:
   a first elongate structural member having one or more transverse slots therein;
   a second elongate structural member having one or more flange portions, each engaging one of the transverse slots;
   means for locking the one or more flange portions in engagement with the transverse slots; and
   a connecting member that overlaps with the first elongate structural member, the connecting member having transverse connecting member slots therein that are aligned with the transverse slots in the first elongate structural member when the connecting member is overlapped with the first elongate structural member.

5. A storage building comprising:
   a horizontal elongate structural member having one or more transverse slots therein;
   a vertical elongate structural member having one or more flange portions, each engaging one of the transverse slots;
   means for locking the one or more flange portions in engagement with the transverse slots; and
   a connecting member overlapping with the horizontal elongate structural member, the connecting member having transverse connecting member slots therein align with the transverse slots in the horizontal elongate structural member when the connecting member is overlapped with the horizontal elongate structural member.

6. The storage building of claim 5, wherein the connecting member defines a corner of the storage building.

* * * * *